US009807563B2

(12) United States Patent
Todd

(10) Patent No.: US 9,807,563 B2
(45) **Date of Patent: *Oct. 31, 2017**

(54) TRANSMISSION OF LOCATION AND DIRECTIONAL INFORMATION ASSOCIATED WITH MOBILE COMMUNICATION DEVICES

(71) Applicant: AT&T Intellectual Property II, L.P., Atlanta, GA (US)

(72) Inventor: Steven Todd, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,744

(22) Filed: Oct. 31, 2016

(65) Prior Publication Data

US 2017/0048675 A1 Feb. 16, 2017

Related U.S. Application Data

(63) Continuation of application No. 14/202,312, filed on Mar. 10, 2014, now Pat. No. 9,485,624, which is a (Continued)

(51) Int. Cl.
*H04W 24/00* (2009.01)
*H04W 4/02* (2009.01)
(Continued)

(52) U.S. Cl.
CPC ............ *H04W 4/025* (2013.01); *G06F 17/30* (2013.01); *H04L 65/00* (2013.01);
(Continued)

(58) Field of Classification Search
CPC ......... H04M 2242/30; H04M 3/42042; H04M 3/42229; H04W 64/00; H04W 4/16;
(Continued)

(56) References Cited

U.S. PATENT DOCUMENTS 6,799,052 B2 9/2004 Agness et al.
6,937,868 B2 8/2005 Himmel et al.
(Continued)

OTHER PUBLICATIONS

U.S. Office Action dated Aug. 25, 2015 in U.S. Appl. No. 14/202,312.
(Continued)

*Primary Examiner* — Joseph Arevalo
(74) *Attorney, Agent, or Firm* — Hartman & Citrin LLC

(57) ABSTRACT

A method and arrangement for providing location information of a called mobile communication device to a calling party are implemented through a mobile device locator platform disposed in the communication network. A mobile device subscriber to the location service initiates a process where the location of his mobile device is updated on a regular basis and the location information stored in a database on the platform. When a call is placed to his subscribed device, the location information is transmitted to the calling party prior to setting up the call to the called device, allowing the calling party to determine whether or not to proceed with the call, as well as eliminating the need to ask the common question "where are you?" when placing a call to a mobile device.

20 Claims, 3 Drawing Sheets

40 24 42

| SUBSCRIBER CELL NUMBER | LOCATION INFORMATION RESTRICTIONS | | |
|---|---|---|---|
| | ALL | CALLER ID ONLY | RESTRICTED LIST |
| AAA-BBB-CCCC | X | Ø | Ø |
| | Ø | X | Ø |
| 181-818-1818 | Ø | Ø | X |
| | | | |

42-1 42-2 42-3

44

| 1818 BUDDY LIST |
|---|
| AAA-BBB-CCCC |
| 121-212-1212 |
| |
| |
| |
| ⋮ |

Related U.S. Application Data continuation of application No. 11/321,827, filed on Dec. 29, 2005, now Pat. No. 8,670,787.

(51) Int. Cl.

| | |
|---|---|
| ***H04M 15/00*** | (2006.01) |
| ***G06F 17/30*** | (2006.01) |
| ***H04L 29/06*** | (2006.01) |
| ***H04M 3/00*** | (2006.01) |
| ***H04W 4/16*** | (2009.01) |
| ***H04M 1/725*** | (2006.01) |
| ***H04M 3/42*** | (2006.01) |
| *H04W 12/02* | (2009.01) |
| *H04L 29/08* | (2006.01) |

(52) U.S. Cl.

CPC ......... *H04M 1/72547* (2013.01); *H04M 3/00* (2013.01); *H04M 3/42059* (2013.01); *H04M 3/42093* (2013.01); *H04M 15/39* (2013.01); *H04W 4/02* (2013.01); *H04W 4/026* (2013.01); *H04W 4/027* (2013.01); *H04W 4/16* (2013.01); *H04L 67/303* (2013.01); *H04W 12/02* (2013.01)

(58) Field of Classification Search

CPC ....... H04W 12/08; H04W 16/26; H04W 4/20; H04W 4/24

USPC ..... 455/456.1, 435.2, 445, 12.1, 427, 414.1, 455/417, 461, 432.3, 406

See application file for complete search history.

(56) References Cited

U.S. PATENT DOCUMENTS

| | | | |
|---|---|---|---|
| 6,980,814 | B2 | 12/2005 | Nohara et al. |
| 7,203,294 | B2 | 4/2007 | Carnazza et al. |
| 7,212,614 | B1 | 5/2007 | Burg et al |
| 7,742,757 | B2 | 6/2010 | Carlson |
| 2002/0149515 | A1 | 10/2002 | Alanen et al. |
| 2002/0181694 | A1 | 12/2002 | Mani |
| 2002/0183069 | A1 | 12/2002 | Myr |
| 2003/0016804 | A1 | 1/2003 | Sheha et al. |
| 2003/0125044 | A1 | 7/2003 | Deloach et al. |
| 2004/0028208 | A1 | 2/2004 | Carnazza et al. |
| 2004/0141602 | A1 | 7/2004 | Gosselin |
| 2004/0170139 | A1 | 9/2004 | Gosselin |
| 2005/0032527 | A1 | 2/2005 | Sheha et al. |
| 2005/0113096 | A1 | 5/2005 | Gayde et al. |
| 2005/0122259 | A1 | 6/2005 | Sairo et al. |
| 2005/0233742 | A1 | 10/2005 | Karaoguz et al. |
| 2006/0251115 | A1 | 11/2006 | Haque et al. |
| 2007/0015507 | A1 | 1/2007 | Petronelli |
| 2007/0179792 | A1 | 8/2007 | Kramer |
| 2007/0189489 | A1 | 8/2007 | Carnazza et al. |

OTHER PUBLICATIONS

U.S. Office Action dated Mar. 4, 2016 in U.S. Appl. No. 14/202,312.

U.S. Notice of Allowance dated Jun. 21, 2016 in U.S. Appl. No. 14/202,312.

U.S. Office Action dated Apr. 30, 2008 in U.S. Appl. No. 11/321,827.

U.S. Office Action dated Oct. 27, 2008 in U.S. Appl. No. 11/321,827.

Examiner's Answer to Appeal Brief dated Jul. 22, 2009 in U.S. Appl. No. 11/321,827.

Patent Board Decision on Appeal dated Apr. 22, 2013 in U.S. Appl. No. 11/321,827.

U.S. Notice of Allowance dated Jul. 11, 2013 in U.S. Appl. No. 11/321,827.

U.S. Notice of Allowance dated Nov. 4, 2013 in U.S. Appl. No. 11/321,827.

10
26
MOBILE LOCATOR PLATFORM
SUBSCRIBER DATABASE
24
AUDIO/ TTS
30
VIDEO
34
GEO DATABASE
28
TEXT
VIDEO
AUDIO
SWITCH
14-0
14-1
PSTN
12
MOBILE BASE STATION
16-1
16-2
18
32
MOBILE COMMUNICATION DEVICE
22
20

24
40
42
SUBSCRIBER CELL NUMBER
LOCATION INFORMATION RESTRICTIONS
ALL
CALLER ID ONLY
RESTRICTED LIST
AAA-BBB-CCCC
181-818-1818
42-1
42-2
42-3
44
1818 BUDDY LIST
AAA-BBB-CCCC
121-212-1212

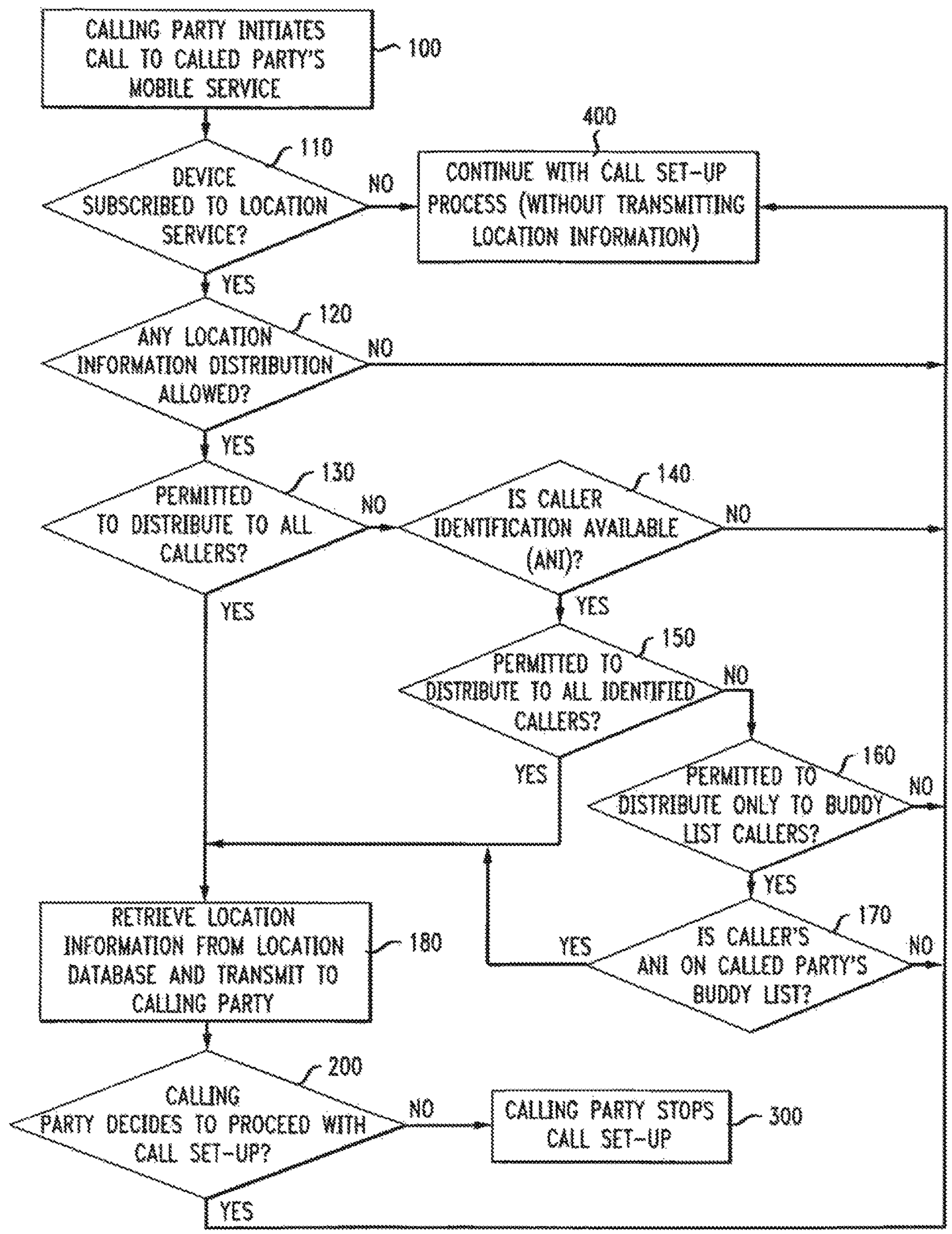
FIG. 3
CALLING PARTY INITIATES CALL TO CALLED PARTY'S MOBILE SERVICE
100
DEVICE SUBSCRIBED TO LOCATION SERVICE?
110
NO
400
CONTINUE WITH CALL SET-UP PROCESS (WITHOUT TRANSMITTING LOCATION INFORMATION)
YES
ANY LOCATION INFORMATION DISTRIBUTION ALLOWED?
120
NO
YES
PERMITTED TO DISTRIBUTE TO ALL CALLERS?
130
NO
IS CALLER IDENTIFICATION AVAILABLE (ANI)?
140
NO
YES
YES
PERMITTED TO DISTRIBUTE TO ALL IDENTIFIED CALLERS?
150
NO
YES
PERMITTED TO DISTRIBUTE ONLY TO BUDDY LIST CALLERS?
160
NO
YES
IS CALLER'S ANI ON CALLED PARTY'S BUDDY LIST?
170
YES
NO
RETRIEVE LOCATION INFORMATION FROM LOCATION DATABASE AND TRANSMIT TO CALLING PARTY
180
CALLING PARTY DECIDES TO PROCEED WITH CALL SET-UP?
200
NO
CALLING PARTY STOPS CALL SET-UP
300
YES

TRANSMISSION OF LOCATION AND DIRECTIONAL INFORMATION ASSOCIATED WITH MOBILE COMMUNICATION DEVICES

CROSS-REFERENCE TO RELATED APPLICATIONS

This application is a continuation of U.S. patent application Ser. No. 14/202,312, filed Mar. 10, 2014, now U.S. Pat. No. 9,485,624, which is incorporated herein by reference in its entirety and which is a continuation of U.S. patent application Ser. No. 11/321,827, filed Dec. 29, 2005, now U.S. Pat. No. 8,670,787, which is incorporated herein by reference in its entirety.

TECHNICAL FIELD

The present invention relates to improved usage of mobile communication devices and, more particularly, to the ability to provide location and directional information of a called mobile communication device to the calling party.

BACKGROUND OF THE INVENTION

With the ever-increasing proliferation of mobile communication devices, there are opportunities daily for one to place a call to a cell phone number of a friend, family member or co-worker. Invariably, the conversation begins with the greeting "Hi, where are you?". In days past, when the telecommunications network was only a wireline network, such a greeting would be considered comical—the called party was at the residence/office associated with his telephone. However, it is now often useful, if not vital information, for the calling party to know the location of a called party using a mobile communication device.

There exists various systems for determining, with extreme precision, the location of each mobile communication device. Geocoding—a triangulation method involving the use of at least a pair of mobile base stations—is a well-understood technique for ascertaining the location of a mobile telephone. Global positioning systems (GPS) have become popular in recent years and are also capable of ascertaining the location of a mobile communication device including the appropriate type of transponder.

In the past, the location information of a mobile device has been used for a variety of applications, such as determining if the device is in a location (such as a hospital) where usage of such a device is prohibited. In this scenario, incoming calls will be immediately sent to the device's voice mail system (or to another "reach" telephone number). The location information of a mobile device may also be used to inhibit the device from initiating outbound calls to "forbidden" geographic areas (i.e., the mobile device may be restricted from placing any long distance and/or international calls).

To date, however, there has not been any development or methodology for providing this location information to a calling party, who may then determine whether or not to complete the call as a function of such location information.

SUMMARY OF THE INVENTION

The need remaining in the prior art is addressed by the present invention, which relates to improved usage of mobile communication devices and, more particularly, to the transmission of the mobile device's current location to someone placing a call (wireline or wireless) to the mobile device user.

In accordance with the present invention, a mobile device user subscribes to a "location" service, such that when others initiate calls to the subscriber's mobile device, his current location information is transmitted during call set-up to the calling party. Since the information is transmitted prior to completing call set up, the calling party may decide to terminate the call without incurring any expenses for either party.

In an advanced embodiment of the present invention, the location information may be enhanced to further include the "direction" and "speed" information associated with the mobile device (if the device is not stationary).

The dissemination of location information is controlled by the subscriber and, as such, the subscriber may determine the population of calling parties that may receive this information. For example, the subscriber may have a "buddy list" of calling party numbers associated with his subscriber record, where only calling parties on this buddy list may receive his location information. Alternatively, the subscriber may allow only incoming calls whose source can be identified (e.g., with CallerID capability) to read his location information (preventing unwanted incoming callers without full identification—"anonymous" or "unknown") from obtaining this information. In its most general form, however, the dissemination of this information does not have to be restricted at all by the subscriber.

In one embodiment of the present invention, the subscriber's location information may be provided as an "audio" message to the calling party. Alternatively, a text message or video message (map) may be transmitted to calling devices with screen capabilities.

Other and further advantages and features of the present invention will become apparent during the course of the following discussion and by reference to the accompanying drawings.

BRIEF DESCRIPTION OF THE DRAWINGS

Referring now to the drawings,

FIG. 3 is a flowchart of an exemplary process of using the location service of the present invention.

DETAILED DESCRIPTION

Figure 1:
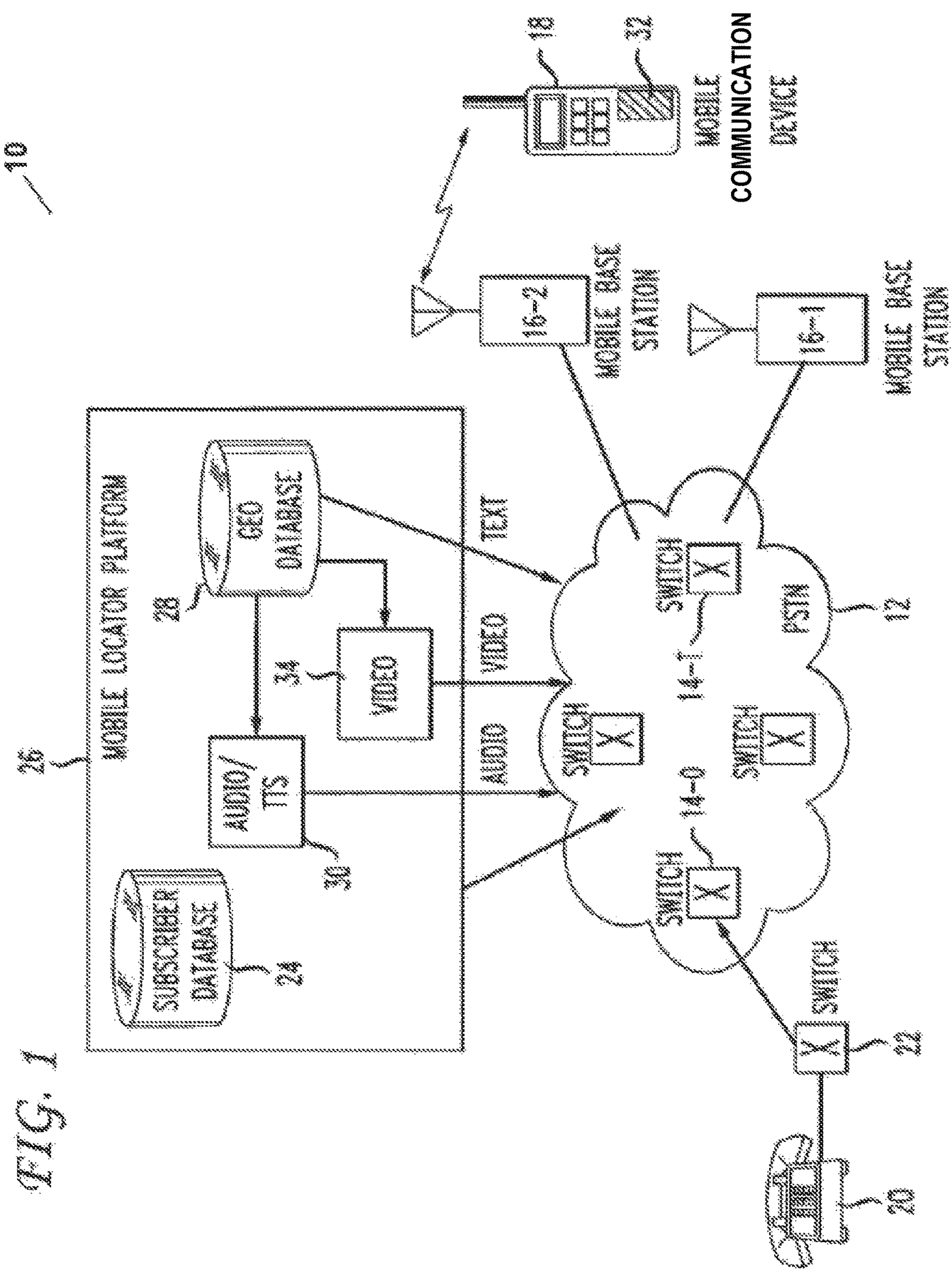
FIG. 1 illustrates an exemplary mobile communication network suitable for implementing the location service of the present invention.

FIG. 1 illustrates, in a simplified diagram, a network architecture 10 for providing mobile communication device location information to a calling party. As shown, architecture 10 includes a conventional telecommunications network 12, such as the Public-Switched Telephone Network (PSTN), including a plurality of switches 14 for routing voice traffic between calling and called parties. Also illustrated in FIG. 1 is a pair of mobile base stations 16-1 and 16-2, where these base stations are in communication with PSTN 12 and used as a "link" in communications between "wired" telephones communicating via the PSTN and "wireless" devices, such as a mobile communication device 18.

In placing a call to mobile device 18, a calling party at a "wired" (i.e., conventional) telephone 20 will go off-hook, receive a dialtone from a local telecommunications switch 22, and enter the digits associated with the cell phone number of mobile device 18 (in most cases, in the NPA-NXX-XXXX format). These digits are collected by switch 22 and forwarded to PSTN 12, in particular to an originating switch 14-0 associated with local switch 22. Originating switch 14-0 determines the necessary routing through PSTN 12 required to set up a communication path between the calling party at telephone 20 and the called party at mobile device 18, and forwards the call to a terminating switch 14-T within PSTN 12.

Up to this point in the call set-up process, there is no difference between the present invention and the prior art. However, in accordance with the present invention, the number associated with the called party (the "dialed number") is checked against a subscriber database 24 located within a mobile locator platform 26 formed in accordance with the present invention to determine if the called party has subscribed to the "location information" service of the present invention. If the dialed number is not found, the call progresses in conventional fashion, outward from PSTN 12 to the appropriate mobile base station for communication to mobile device 18.

If the called party/mobile device user is determined to have subscribed to the inventive "location information" service, the method of the present invention proceeds to first determine if there are any restrictions on the distribution of this information to calling parties. This restriction will be discussed below in association with the description of the database record in FIG. 2. Presuming that restrictions are not placed on the distribution of this information, the next step in the inventive method is to ascertain the current location of mobile device 18. In one implementation of the present invention, a geographic locator database 28 within mobile locator platform 26 is queried to determine the current location of the called party's mobile device 18. Geographic locator database 28 is maintained, for example, through regular updates (at five minute intervals, for example), through mobile base stations 16 that are also in communication with mobile locator platform 26. Alternatively, a real-time locating method (such as gee-coding triangulation) may be used to determine the location of mobile device 18.

Once the location information has been collected, this information is transmitted on the return call set-up path to the calling party's telephone 20, enabling the calling party to learn the geographic location of the called party without having to ask the called party "where are you?" once their conversation has begun. In one embodiment, the geographic location information may be converted to audio information within a translation unit 30 at locator platform 26 and transmitted as a return voice message to the calling party. For example, the message may be "you are now being connected to John Doe in Smithtown New York". The message may also include "branding" information identifying the particular wireless service provider that is placing the call (i.e., "AT&T Wireless Services is now connecting you to John Doe in Smithtown, New York").

It is known that the use of various "locator" methods may also obtain information regarding the current movement of a mobile device. For example, if mobile device 18 includes a location transponder 32, the real-time movement of mobile device 18 may be tracked and recorded. This speed and direction information may thus also be collected at mobile locator platform 26 and provided with the basic "location" information to the calling party. For example, the message to the calling party may be, "you are now being connected to John Doe, in Smithtown, New York, traveling south at 30 miles per hour". Therefore, with this additional information the calling party may decide to terminate the call, on the presumption that the called party is driving and should not be bothered. Many times, a calling party may only be interested in knowing the location of the called party (for example, a parent calling a teenaged child) and once this information is obtained, the call may be terminated (that is, prior to completing call set-up and initiating conversation and incurring expense).

In an alternative embodiment, if it is known that the calling party's device includes a video display (such as, for example, on another cell phone or computer-based calling device), the location information may be converted into a video file within a video conversion unit 34 at platform 26 and then transmitted as a video file (either still-frame or moving frame), indicating the current location of the called party. Obviously, both the audio and video information may be transmitted, if desired, to the calling party. The location information, alternatively, may be directly transmitted as a text message from database 28 to calling party 20.

Once the location message has been delivered to calling party 20, the call set-up process will suspend action for a brief period of time (no more than a few seconds) so as to allow for the calling party to terminate the call without incurring any charges. That is, if the calling party determines, based on the received location information, that it would not be appropriate (or necessary) to try to contact the called party at that time, the calling party can merely hang up without incurring any charges. Otherwise, call set-up proceeds in conventional fashion and a voice call between the two parties can be initiated.

Figure 2:
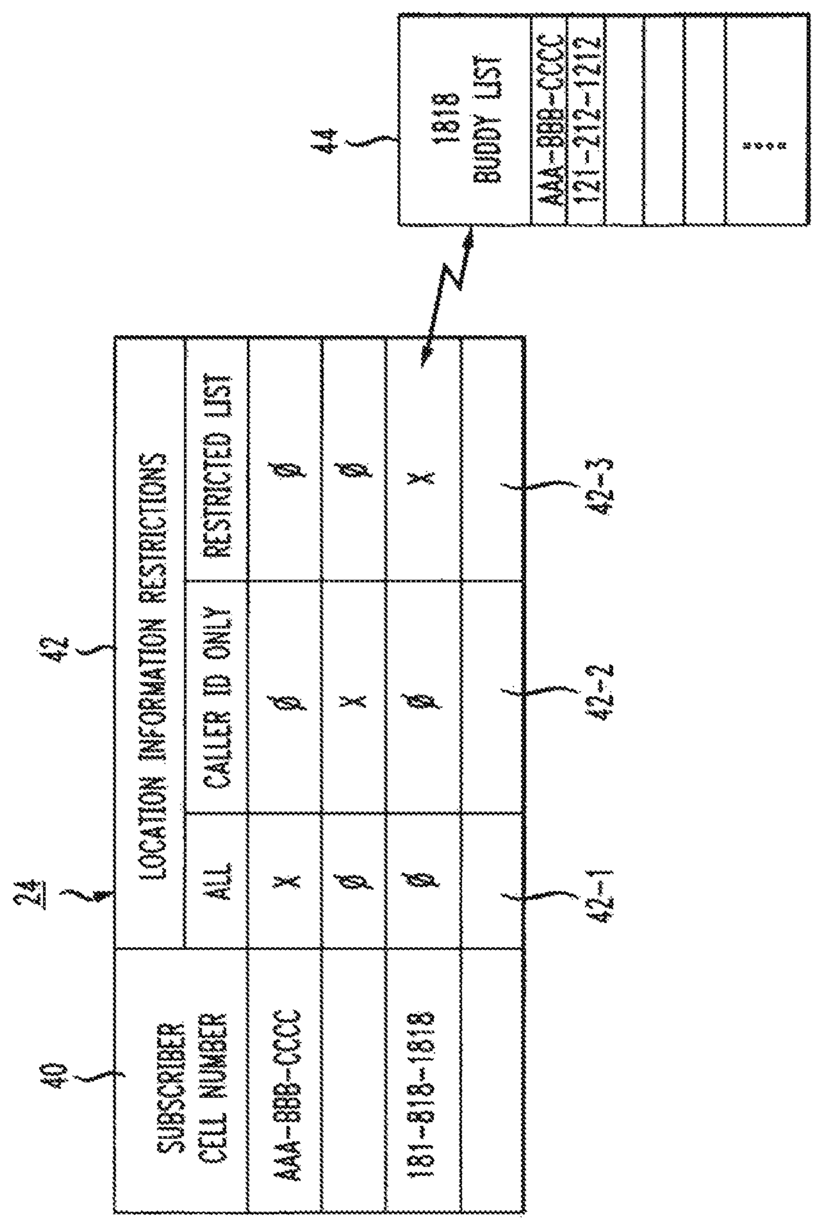
FIG. 2 illustrates an exemplary subscriber record.

FIG. 2 illustrates one exemplary configuration for subscriber database 24 as may be employed within mobile locator platform 26. As shown, this particular embodiment of database 24 includes a first field 40 listing the mobile device numbers (e.g., "cell phone" numbers) for the various subscribers to the inventive location identification service. A second field 42, defined as "location information restrictions", is used to determine to whom the subscriber's location information may be given. In this particular embodiments, restriction field 42 is broken down into three sub-fields, defined as "all" (sub-field 42-1), "identified callers only" (sub-field 42-2), and "restricted list" (sub-field 42-3). Of course, various other configurations and definitions of restrictions may be implemented in accordance with the present invention. For each subscribed mobile device telephone number, only one sub-field may be flagged as the defined restrictions. As shown, for cell phone number AAA-BBB-CCCC, sub-field 42-1 is flagged. In this case, therefore, the location information associated with mobile device AAA-BBB-CCCC may be given to every calling party. For mobile device 18 as discussed above in association with FIG. 1, restricted or "buddy list" sub-field 42-3 is flagged. In this particular arrangement, this flag is linked to a particular "buddy list" 44 provided by the subscriber, where his location information will be given only to the small set of calling numbers included on the buddy list. At any given time, a subscriber may turn "off" the location service by disabling one or more of the sub-fields. For example, over the weekend the called party's location information may not be germane to co-workers. The subscriber is permitted to gain access to database 28 and thus modify the activation of the various fields, as need be.

In a preferred embodiment of the present invention, the subscriber is permitted access to his specific record within database 24 and can, accordingly, modify the entries in his buddy list, or change the "restriction" sub-field flag in general. Moreover, it is presumed that a subscriber will have access to information at platform 26 in terms of generating a “report” identifying the frequency of callers, identity of callers, who (if any) terminated calls prior to set-up, etc.

FIG. 3 contains a flowchart of an exemplary process of providing mobile device location information in accordance with the present invention. As shown, the process begins at step 100 with an individual placing a call to a mobile device number. When the call is initiated, a query is made to subscriber database 24 (step 110) to determine if the called number is subscribed to the location service. If not, the call set-up will continue in conventional fashion—that is, without transmitting any location information (step 400). If the called party is a subscriber, the next step (step 120) is to check for permission to distribute location information to the calling party (since the invention includes the ability for the subscriber to turn the permissions “on” and “off”, as desired). If the permission is indeed turned “off”, no location information may be transmitted and the process moves to step 400 for conventional call set-up.

Presuming that distribution of location information is permitted, the next step in the process (step 130) is to determine if the location information may be distributed to all calling parties (i.e., no restrictions). If the response to this query is in the negative, the next step (step 140) begins the process of determining what “class” of calling parties may receive the location information by determining if calling number identification information (such as ANI) is present. If no such information exists (thus indicating that the incoming call is a “nuisance” call), then the process again proceeds to step 400 for conventional call set-up. Otherwise, if caller identification information is present, a query is performed (step 150) to determine if the subscriber has given permission to distribute the location information to all identified callers. If the response to this query is in the negative, the next step in the process (step 160) is used to determine if the subscriber has supplied a “buddy list” of identified calling parties to which the location information may be distributed. If no buddy list is found, then conventional call set-up process is performed (step 400). If a buddy list for the subscriber is found, step 170 then determines if there is a match between the calling party’s identification information (e.g., ANI) and an entry in the subscriber’s buddy list. If there is no match, the process returns to conventional call set-up at step 400.

If there is a match between the calling party’s identification information and a buddy list entry, the process continues to step 180 to retrieve the location information from geographic database 28 and transmit the location information to the identified calling party. Referring to the flowchart of FIG. 3, it is shown that a positive result to the queries of steps 130 and 150 (“all callers”, and “all identified callers”) also results in the process progressing to step 180 to retrieve the location information from database 28 and transmit to the calling party.

Once the calling party has received this information, the process “waits” for a response from the calling party (step 200) to see if the calling party wishes to continue with the call set-up process. If the response is negative, call set-up ceases and no charges are incurred by either party. Otherwise, the process then moves forward to step 400 to complete the call set-up.

The description of the present invention has been presented for purposes of illustration and description, and is not intended to be exhaustive or limited to the invention in only the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular contemplated use.

What is claimed is:

1. A method comprising:

in response to receiving an incoming call from a calling party to a mobile communication device of a called party, verifying, using a database of mobile communication device subscribers to a location service, whether the mobile communication device of the called party is subscribed to the location service;

in response to verifying that the mobile communication device of the called party is subscribed to the location service, retrieving location information of the mobile communication device of the called party and speed and direction information of the mobile communication device of the called party;

transmitting, to the calling party during a call set-up between the calling party and the called party, the location information of the mobile communication device of the called party and the speed and direction information of the mobile communication device of the called party; and after transmitting the location information of the mobile communication device of the called party and the speed and direction information of the mobile communication device of the called party to the calling party, suspending the call set-up for a period of time to allow the calling party to terminate the incoming call.

2. The method of claim 1, wherein the database of mobile communication device subscribers to the location service includes a listing of permitted calling numbers for receiving the location information, and wherein the method further comprises determining if a calling number associated with the calling party is on the listing prior to transmitting the location information of the mobile communication device of the called party and the speed and direction information of the mobile communication device of the called party to the calling party.

3. The method of claim 1, further comprising determining if calling number identification information associated with the incoming call from the calling party is present prior to transmitting the location information of the mobile communication device of the called party and the speed and direction information of the mobile communication device of the called party to the calling party.

4. The method of claim 1, wherein the location information of the mobile communication device of the called party is transmitted to the calling party as a text message.

5. The method of claim 1, further comprising translating the location information of the mobile communication device of the called party into a video map, wherein transmitting the location information of the mobile communication device of the called party comprises transmitting the location information of the mobile communication device of the called party as the video map.

6. The method of claim 1, further comprising generating a report identifying any calling parties to the mobile communication device of the called party who terminated incoming calls prior to the call set-up.

7. The method of claim 1, wherein the calling party does not incur a charge for the incoming call if the incoming call is terminated during the period of time that the call set-up is suspended.

8. The method of claim 1, wherein retrieving the location information of the mobile communication device of the called party and the speed and direction information of the mobile communication device of the called party comprises querying a locator database to determine the location information of the mobile communication device of the called party and the speed and direction information of the mobile communication device of the called party.

9. The method of claim 1, wherein the database of mobile communication device subscribers comprises a plurality of mobile device numbers associated with subscribers to the location service, and wherein verifying whether the mobile communication device of the called party is subscribed to the location service comprises determining whether a mobile device number associated with the mobile communication device of the called party is one of the plurality of mobile device numbers of the database of mobile communication device subscribers.

10. The method of claim 1, wherein the speed and direction information of the mobile communication device of the called party is tracked by a location transponder of the mobile communication device of the called party.

11. A system comprising a switch for:

in response to receiving an incoming call from a calling party to a mobile communication device of a called party, verifying, using a database of mobile communication device subscribers to a location service, whether the mobile communication device of the called party is subscribed to the location service;

in response to verifying that the mobile communication device of the called party is subscribed to the location service, retrieving location information of the mobile communication device of the called party and speed and direction information of the mobile communication device of the called party;

transmitting, to the calling party during a call set-up between the calling party and the called party, the location information of the mobile communication device of the called party and the speed and direction information of the mobile communication device of the called party; and after transmitting the location information of the mobile communication device of the called party and the speed and direction information of the mobile communication device of the called party to the calling party, suspending the call set-up for a period of time to allow the calling party to terminate the incoming call.

12. The system of claim 11, wherein the database of mobile communication device subscribers to the location service includes a listing of permitted calling numbers for receiving the location information, and wherein the switch is further for determining if a calling number associated with the calling party is on the listing prior to transmitting the location information of the mobile communication device of the called party and the speed and direction information of the mobile communication device of the called party to the calling party.

13. The system of claim 11, wherein the switch is further for determining if calling number identification information associated with the incoming call from the calling party is present prior to transmitting the location information of the mobile communication device of the called party and the speed and direction information of the mobile communication device of the called party to the calling party.

14. The system of claim 11, wherein the location information of the mobile communication device of the called party is transmitted to the calling party as a text message.

15. The system of claim 11, further comprising a text-to-video module for translating the location information of the mobile communication device of the called party into a video map, wherein transmitting the location information of the mobile communication device of the called party comprises transmitting the location information of the mobile communication device of the called party as the video map.

16. The system of claim 11, wherein the switch is further for generating a report identifying any calling parties to the mobile communication device of the called party who terminated incoming calls prior to the call set-up.

17. The system of claim 11, wherein the calling party does not incur a charge for the incoming call if the incoming call is terminated during the period of time that the call set-up is suspended.

18. The system of claim 11, wherein retrieving the location information of the mobile communication device of the called party and the speed and direction information of the mobile communication device of the called party comprises querying a locator database to determine the location information of the mobile communication device of the called party and the speed and direction information of the mobile communication device of the called party.

19. The system of claim 11, wherein the database of mobile communication device subscribers comprises a plurality of mobile device numbers associated with subscribers to the location service, and wherein verifying whether the mobile communication device of the called party is subscribed to the location service comprises determining whether a mobile device number associated with the mobile communication device of the called party is one of the plurality of mobile device numbers of the database of mobile communication device subscribers.

20. The system of claim 11, wherein the speed and direction information of the mobile communication device of the called party is tracked by a location transponder of the mobile communication device of the called party.

* * * * *